3,019,611
RECOVERY OF FRESH WATER FROM
SEA WATER
Harry A. Toulmin, Jr., Dayton, Ohio, assignor to The
Commonwealth Engineering Company of Ohio, Dayton, Ohio
Filed Oct. 18, 1960, Ser. No. 68,322
8 Claims. (Cl. 62—58)

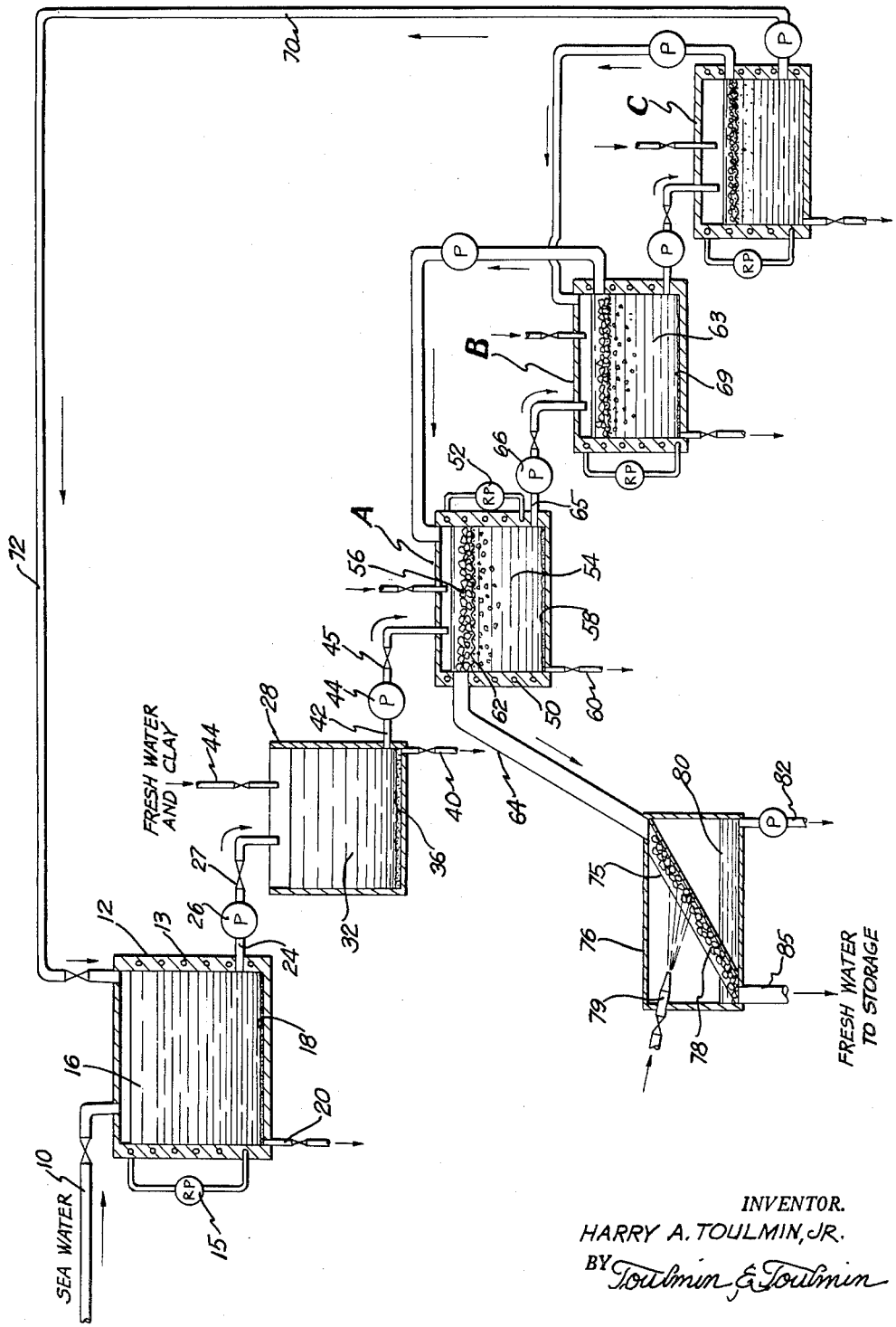

This invention relates to a method of converting saline waters into fresh waters, and more particularly to an improved method for extracting fresh water from sea water.

The improved method of this invention broadly comprises the coordinated use of precipitation and refrigeration treatment for the removal of insoluble impurities such as are present in saline and brackish waters.

While it has been proposed heretofore to refrigerate sea water to recover water as ice crystals, the latter being melted to form water which is relatively free of salt, the process has not been commercially successful because the ice crystals are relatively large in size and occlude substantial amounts of the salt present. This, of course, renders such a process inefficient.

In accordance with the present process, these disadvantages are overcome, or at least minimized, employing a combination of a precipitation treatment and a series of successive freezing or refrigeration treatments of salt water to recover a relatively fresh water.

In accordance with the present invention, a process is provided whereby sea water can be economically treated to recover fresh water therefrom. In carrying out the process, the water being treated, and which contains salt and impurities to be removed, the first step is, initially chilling the water to a temperature near the freezing point of the water; secondly then treating the water with siliceous clay to cause a precipitate comprising aluminum hydroxide to form and settle out which brings about the absorption and removal of a large portion of the impurities. Thereafter, the remaining water is subjected to a series of successive refrigeration treatments at temperatures to cause ice crystals to form during each treatment, suitable provision being made to separate and remove ice crystals free of salt after each refrigeration treatment. The ice crystals, thus removed are melted to recover relatively fresh water.

By this means of first scrubbing the water followed by a so-called "step-freeze" treatment, the water is not only cleaned for use, but makes it possible to remove all extraneous matter that would impede, inhibit and nullify subsequent freezing or step-freeze treatment. The steps of (a) scrubbing and (b) freezing relatively pure water solves the problem long sought for use of sea water as a source of potable water.

The drawing discloses a schematic arrangement for carrying out the process in the treatment of saline waters to recover relatively fresh water.

In the embodiment and method illustrated and which is employed for the treatment of sea water, the latter is pumped or conveyed through a conduit 10 to the tank 12. The arrows on the drawing indicate the direction in which the material flows through the apparatus or system. Tank 12 is equipped for refrigeration by means of coils 13 through which refrigerant, e.g., ammonia or other suitable refrigerating agent such as Freon —22 (difluor monochloro methane) may be circulated by means of pump 15.

The sea water 16 as contained in tank 12 is chilled to approximately 27° F., or to a temperature just above that at which ice crystals form. This chilling treatment causes insoluble impurities to settle out and collect on the bottom of the tank 12 with or without the use of scrubbing material.

After the thus chilled sea water is allowed to stand for a suitable period, depending upon the amounts of impurities present, the lower layer containing these impurities 18 is drained off through a discharge conduit 20, as indicated by the arrows on the drawing.

After draining off the lower impurity-containing layer, the water remaining is pumped from tank 12 through conduit 24, as by a pump 26 through pipe line 27 to the precipitation tank 28. The pre-treated water 32 in tank 28 is then treated with siliceous clay admixed with fresh water to provide a thin aqueous-clay slurry which is readily disseminated and dispersed throughout the body of water 32 without the need of a stirrer. The slurry consists of approximately one pound of clay to fifty pounds of fresh water. The proportion of the clay added to the water in tank 28 varies depending primarily upon the amount of soluble salts dissolved in the water being treated, but in general approximately one pound per one hundred pounds of the saline water treated.

The treatment of the water in tank 28 with clay brings about a precipitation of substantial amounts of the salt together with the formation of some aluminum hydroxide. The latter, which is formed by the addition of the clay, assists in removing salt and inorganic impurities from the water.

The siliceous clays employed in carrying out the precipitation treatment contain substantial amounts of aluminum silicate which is preferably in the form of kaolinite or hydrated aluminum silicate $$(Al_2H_2SiO_4.2H_2O)$$

Such hydrated aluminum silicates in the presence of water form appreciable amounts of aluminum hydroxide, the latter tend to adsorb the salt and impurities which settle forming a lower layer 36 in tank 28.

After treating the water with clay in tank 28, the impurity-containing layer 36 is drained off through discharge conduit 40. Thereafter the remaining water is transferred to a freezing tank generally designated A, the water being drawn or pumped from tank 28 through conduit 42, pump 44, and pipe 45 to the freezing tank A.

In the apparatus or system employed for carrying out the process of the invention, a series of freezing tanks are used, as illustrated at A, B and C. Each of the freezing tanks is equipped for refrigerating the water employing successive freezing treatments. In tank A the temperature of the water is lowered to cause water to freeze out of the body of water as ice crystals, the temperature being lowered from tank A through tank C by a 5° F. differential to produce relatively uniform size ice crystals and which are substantially free, or at least very low in occluded salt or mother brine. The temperature of the water in tank A for ordinary sea water is about 22° F. and in tank B approximately 17° F., and in tank C about 12° F., the initial and freezing temperature in each tank may be varied such as to bring about the freezing out of ice crystals in substantial amounts but without the formation of large blocks of ice.

Referring to refrigerating tank A, the same comprises refrigerator coils 50 through which refrigerant is circulated, similarly as described with respect to tank 12. This is effected by means of pump 52 whereby the water, as indicated at 54, is frozen out as ice crystals 56 and float to the uppermost part of the tank. During the freezing treatment a certain amount of precipitate is formed as at 58, which settles to the bottom of the tank and may be removed through the discharge conduit 60.

In the freezing tank arrangement illustrated, a screen 62 is suitably positioned near the top of the tank and just below the opening of the discharge conduit 64, being near the surface of the water. This screen is of a mesh size opening such as will permit the passing therethrough of ice crystals of a size on the order of 3 mm. (millimeters) in diameter. Ice crystals which are of smaller size than this are retained below the screen 62 and are pumped out of the tank along with the brine concentrate 63 through conduit 65 by a pump 66 and transferred to a second freezing tank B where the water is again subjected to freezing at a temperature of about 5 degrees lower than tank A, as heretofore explained.

After drawing off the precipitate 69 from tank B, the water is transferred to tank C, and again treated to freezing similarly as in tank B. The final brine water which has been thus treated, and whereby relatively fresh water is frozen out, is returned through the conduit or pipes 70 and 72, back to the tank 12, and the cycle repeated.

In the treatment of the salt water as shown in the freezing tank A, the ice crystals which were formed at the top of the tank as shown at 56, are removed through a conduit 64 and discharged onto a chute 75 of a rinsing or washing tank 76. Fresh water is sprayed onto the ice crystals 78 as they flow down the inclined chute to remove any impurities clinging to the surface. The rinse water is suitably applied to the ice crystals by a spray nozzle 79. The water, which has been used to rinse the ice crystals may be withdrawn through a conduit 82 and used over again or, if desired, returned to the system for processing similarly as the salt water.

As illustrated in the drawings, the ice crystals 78 are withdrawn through conduit 85 and melted to recover fresh water.

The preliminary elimination of the solids in the water facilitate the freezing process whereby water is frozen as ice crystals which are relatively free of the impurities and objectionable soluble salts.

A series of freezing tanks are employed, as shown, to treat the salt water after the water has been subjected to the clay precipitation treatment. The number of precipitation and freezing tanks may be varied depending upon the amount of treatment which is desired to be used and the amount of salt and impurities to be removed from the sea water or like saline water.

Further, as illustrated in the drawings, the smaller size ice crystals, and such as are retained below the screens in the freezing tanks A, B, and C are recycled through the freezing tank and function as seeding crystals in the further freezing tanks.

It will be understood from the drawings, as explained, that the ice crystals of a size above about 3 mm. in diameter will be pumped out as a slushy ice mass of crystals from the freezing tanks B to A, and from C to B, as shown on the drawings, for retreatment.

In the freezing tank A, ice crystals collected at the top are discharged through conduit 64 to the rinsing tank 76 from which the ice crystals are rinsed, subsequently melted and recovered as fresh water as heretofore described.

In carrying out the process to produce fresh water from salt water, the same is admitted to the system at a temperature of about 40 to 50° F., and the first tank 12, as explained, is cooled by the refrigerator coils to bring the water to a temperature of approximately freezing. The resultant treated water, after settling, then passes to the precipitating tank 28 where it is treated with clay while cooled, and finally the resultant treated water is transferred to the freezing tanks A, B, and C, as explained.

Under ordinary operating conditions, it is unnecessary to employ stirring equipment. Thus, the invention eliminates the cost of installing and operating such equipment.

While the invention has been illustrated and described with particular reference to sea water as illustrated in the drawing, it will be understood that the system and the method of treating may be modified by those skilled in the art and utilized to treat various waters such as brackish waters, or waters containing other than salt, but dissolve the organic substances. The invention is more particularly defined in the appended claims.

By utilizing a pre-scrubbing step to remove objectionable salt and precipitable impurities, the subsequent freezing treatment is accelerated. As the freezing steps will not be satisfactorily performed if there are objectionable solids present, this insures the elimination of such solids. This is important since the freezing treatment will not freeze out the water as ice crystals which are substantially free of salt and other impurities such are present in the mother brine.

What is claimed is:

1. A method of treating saline waters to recover relatively fresh water which comprises subjecting the saline water to a combination of a precipitation treatment and a refrigeration treatment, said precipitation treatment comprising the introduction of siliceous material containing hydrated aluminum silicate to said saline water and separating the precipitate therefrom, said refrigeration treatment comprising refrigerating the resultant precipitate-free saline water to cause water to freeze out as ice crystals, separating said ice crystals from the mother saline water and melting the ice crystals to recover fresh water.

2. A method of treating saline waters to recover relatively fresh water which comprises subjecting the saline water to a combination of a precipitation treatment and a refrigeration treatment, said precipitation treatment comprising the introduction of siliceous clay material containing hydrated aluminum silicate to said saline water and separating the precipitate therefrom, said refrigeration treatment comprising refrigerating the resultant precipitate-free saline water to cause water to freeze out as ice crystals, separating said ice crystals from the mother saline water and melting the ice crystals to recover fresh water, said refrigeration treatment comprising a plurality of successive refrigerating and ice crystals separation procedure steps.

3. A method of treating saline waters to recover relatively fresh water which comprises subjecting the saline water to a combination of a precipitation treatment and a refrigeration treatment, said precipitation treatment comprising the introduction of siliceous material containing hydrated aluminum silicate to said saline water and separating the precipitate therefrom, said refrigeration treatment comprising refrigerating the resultant precipitate-free saline water to cause water to freeze out as ice crystals, separating said ice crystals from the mother saline water and melting the ice crystals to recover fresh water, said precipitation treatment being carried out by cooling the saline water and introducing hydrated aluminum silicate therein.

4. A process for treating saline waters to recover relatively fresh water as set forth in claim 1, wherein the saline water is initially refrigerated to near the freezing temperature to cause insoluble material to precipitate, and thereafter separating the resultant precipitate prior to subjecting the precipitate-free water to refrigeration to freeze out water as ice crystals.

5. A process for treating saline waters to recover relatively fresh water as set forth in claim 1, wherein the saline water is initially refrigerated to near the freezing temperature to cause insoluble material to precipitate, and subjecting the resultant saline water freed of precipitate to successively refrigerating treatments at lower differential temperatures whereby a substantial amount of the water is frozen out as ice crystals.

6. Apparatus for treating saline waters to recover relatively fresh water, which comprises a precipitation tank and a plurality of refrigeration tanks connected in series, said precipitation tank comprising means for introducing siliceous material containing hydrated aluminum silicate, and means including a conduit interconnecting the last of said series of tanks with the first for returning treated water for retreatment whereby said saline water is subjected to precipitation treatment and refrigeration treatment to separate the impurities and produce ice crystals of water.

7. Apparatus for treating saline waters to recover relatively fresh water, which comprises a precipitation tank and a plurality of refrigeration tanks connected in series, said precipitation tank comprising means for introducing siliceous material containing hydrated aluminum silicate, and means including a conduit interconnecting the last of said series of tanks with the first for returning treated water retreatment whereby said saline water is subjected to precipitation treatment and refrigeration treatment to separate the impurities and produce ice crystals of water, said apparatus comprising means for separating precipitate material and additional means for separating ice crystals, and including means for moving said ice crystals counter to said saline water being treated.

8. A method of treating saline waters to recover relatively fresh water which comprises subjecting the saline water to a combination of a precipitation treatment and a refrigeration treatment, said precipitation treatment comprising the introduction of clay which contains a hydrated aluminum salt to cause the formation of substantial amounts of aluminum hydroxide, and thereafter separating the precipitate therefrom, said refrigeration treatment comprising refrigerating the resultant precipitate-free saline water to cause water to freeze out as ice crystals, separating said ice crystals from the mothe saline water and melting the ice crystals to recover fresh water, said refrigeration treatment comprising a plurality of successive refrigerating and ice crystals separation procedure steps.

References Cited in the file of this patent

UNITED STATES PATENTS

| 2,904,511 | Donath | Sept. 15, 1959 |

FOREIGN PATENTS

| 70,507 | Norway | June 3, 1946 |

OTHER REFERENCES

Ellis Publication: "Fresh Water From the Ocean," pages 178–181, 1954.